Oct. 27, 1925.

W. H. CLEGG 1,558,840

BRAKE MECHANISM FOR RAILWAY CARS

Filed June 12, 1924

Inventor:
William H. Clegg
By
Gillson, Munn & Cox
Attys.

Patented Oct. 27, 1925.

1,558,840

UNITED STATES PATENT OFFICE.

WILLIAM H. CLEGG, OF MONTREAL, QUEBEC, CANADA, ASSIGNOR TO UNIVERSAL DRAFT GEAR ATTACHMENT COMPANY, A CORPORATION OF ILLINOIS.

BRAKE MECHANISM FOR RAILWAY CARS.

Application filed June 12, 1924. Serial No. 719,694.

*To all whom it may concern:*

Be it known that I, WILLIAM H. CLEGG, a subject of the Dominion of Canada, and resident of Montreal, county of Hochelaga, and Province of Quebec, Canada, have invented certain new and useful Improvements in Brake Mechanisms for Railway Cars, of which the following is a specification, and which are illustrated in the accompanying drawings, forming a part thereof.

Figure 1:
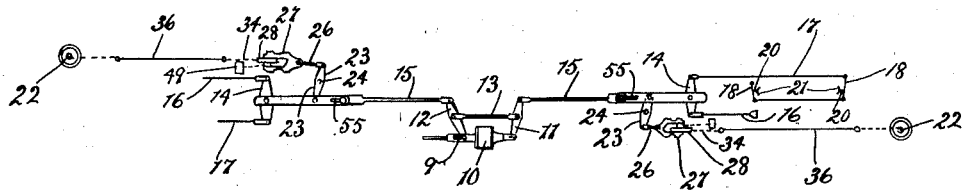
Figure 2:
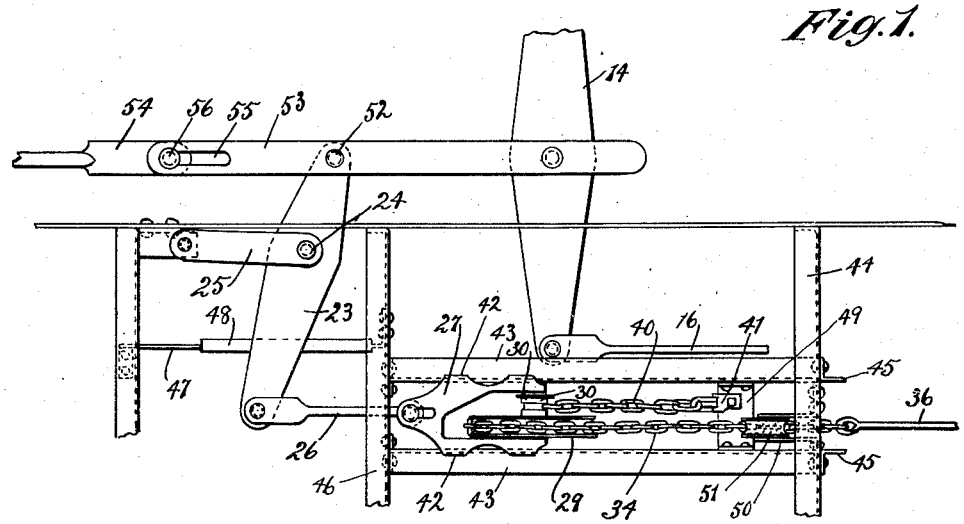
Figure 3:
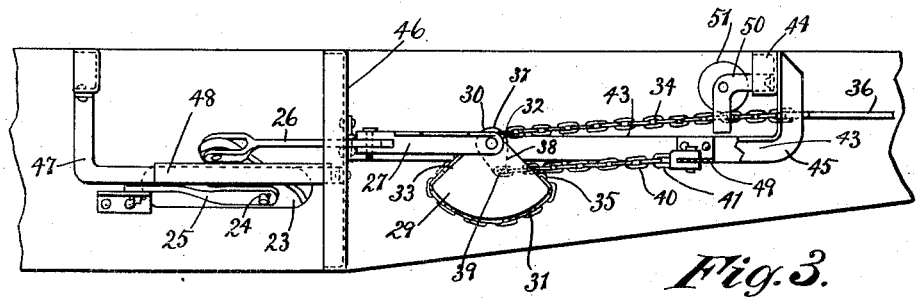

This invention relates to brake mechanisms for railway cars and has for its principal objects to permit the brakes to be applied by hand without giving idle and useless movement to parts that transmit power from the air cylinder to the brake shoes, to permit the power of the hand brake mechanism to be applied to part of the brake shoes only; and to generally improve features of the hand brake mechanism. Further objects and advantages of the invention will become apparent as the disclosure proceeds and the description is read in connection with the accompanying drawing illustrating selected embodiments of the invention, and in which Fig. 1 is a diagrammatic view of the brake mechanism including the invention;

Figs. 2 and 3 are plan and side elevation showing the hand brake mechanism in detail and its connection with the foundation brake gear of the air brake mechanism.

To illustrate the application of the invention a selected embodiment has been shown in connection with the American Railway Association's recommended practice for high speed foundation brake gear for passenger service with inside hung brakes. Referring to the diagram in Fig. 1, such brake gear will be seen to include an air cylinder 10, two cylinder levers 11 and 12 cooperating through a cylinder lever connection 13, floating levers 14, cylinder and floating lever connections 15, floating lever fulcrum chains 16, top connections 17, truck levers 18, bottom connections 19, brake beams 20 and brake shoes 21. The air brake cylinder 10 is equipped with a piston having a push rod 9 connected with one end of the cylinder lever 12 and serving to operate the brake gear when air pressure is admitted to the cylinder 10.

The hand brake mechanism includes a brake staff 22 suitably mounted on the frame of the car and equipped with the usual, or any preferred, mechanism for winding it and controlling its position. Power developed by the brake staff is communicated to a hand brake lever 23 fulcrumed at 24 on the fulcrum bracket 25, secured to the car frame. One end of the hand brake lever is pivotally attached to a hand brake connection 26 extending toward the brake staff and equipped with a brake jaw 27 in which a multiplying lever 28 is rotatably mounted.

This lever includes two arms 29 and 30. The former has a working or drum surface 31 of relatively large diameter connected with a drum surface 32 of relatively small diameter by what may be termed the leading face 33 of the arm which also serves as a working face for cooperation with a chain 34. This chain preferably has one end attached to the rear face 35 of the arm 29, passes over the drum surfaces 31, 32, and the leading face 33, and has its opposite end in winding engagement with the brake staff. The intermediate portion of this chain may be replaced by a rod 36, if desired.

The arm 30 has a relatively small drum surface 37 and an inclined face 38, leading to a point of connection 39 with a chain 40, which has one end anchored at 41 to the car frame in any suitable manner.

Assuming that the parts are in slack position, as illustrated in Fig. 3, a very slight movement on the chain 34 to the right will cause the leading face 33, of the arm 29, to swing through a wide angle with the corresponding rotation of the arm 30 through a wide angle, but the arm 30 is in a position in which rotation takes up the chain 40 very rapidly. Consequently, a very slight movement of the brake staff causes sufficient movement of this multiplying lever to quickly take up the slack. As soon as the leading face 33 rotates to the right the leverage of the chain 34 rapidly increases from that of the drum surface 32 to that of the drum surface 31, thereby greatly multiplying the power of the brake staff. Corresponding movement of the arm 30 results in the change of leverage from that of the point 39 to the small drum surface 37, thereby further multiplying the power of the brake staff. Briefly stated, the arms of this lever are arranged to take advantage of the law that a point traveling about a circle will, in one arc, move chiefly in one direction, and in another arc, will move chiefly in another direction.

The jaw 27 is preferably equipped with lateral flanges 42 which rest upon the upper surfaces of angles 43, or other supporting guides. As shown, these angles extend downwardly from a brace 44 and are bent at 45 to give their guiding portions the proper position relative to the length of the car. The rear end of the angles are suitably secured to a cross brace 46.

The hand brake lever 23 is also equipped with a guiding support that may consist of a bracket 47, equipped with a flattened surface 48, here shown as consisting of a piece of angle riveted to it.

The anchorage for the chain 40 is conveniently made by riveting a plate 49 between the angles 43 adjacent to the cross piece 44.

This cross piece also carries a bracket 50 in which a guide pulley 51 is mounted to co-operate with the chain 34 during the operation of the brake gear.

The hand brake lever 23 is suitably connected to the foundation brake gear. As shown, a pin 52 pivots it to the cylinder and floating lever connection, but obviously the arrangement may be greatly varied.

The cylinder and floating lever connection is preferably made in two parts 53 and 54 and the former preferably has a slot 55 in which a pin 56 carried by the latter may move freely to permit the floating levers to be operated without corresponding rotation of the cylinder levers 11 and 12, the push rod 9, the pistons, etc.

Substantially the same result might be accomplished by interposing a special link between the hand brake lever 23 and the floating lever 14. The gist of the connection is to permit the brake staff at one end of the car to be operated and apply the brakes at that end of the car without moving the parts of the foundation brake gear not necessary to such an operation. This also permits the brakes to be applied by hand at one end of the car without applying them at the other end.

The inertia and friction of the parts of the foundation gear usually moved by the hand brakes consume a large percentage of power of the hand brake mechanism. With this invention all the power applied to the brake staff is available for use in the work of pressing the brakes against the wheels.

The multiplying lever interposed between the brake staff and the hand brake lever permits a very quick take up and a very powerful brake application.

In order to facilitate disclosure use has been made of a particular illustration and descriptive language, but I do not wish to be limited thereby or in any other manner than is made necessary by the prior art.

I claim as my invention:

1. In a brake mechanism for railway cars, the combination of a brake staff, a hand brake connection, a brake jaw attached to the connection, means to support the jaw with free longitudinal movement, a lever fulcrumed in the jaw having an arm provided with a drum surface of large diameter connected with a drum surface of small diameter by an inclined face, a chain cooperating with said drum surfaces and inclined face, and in winding engagement with the brake staff, said lever having another arm provided with a drum surface of small diameter and a chain cooperating with the last mentioned arm and an anchorage.

2. In a brake mechanism for railway cars, the combination with a foundation brake gear including a cylinder lever, a floating lever, and a cylinder and floating lever connection having a sliding joint, of a hand brake including a hand brake lever having one end pivoted to the cylinder and floating lever connection, a brake staff, and a multiplying lever between the brake staff and the opposite end of the hand brake lever.

3. In a brake mechanism for railway cars, the combination of a foundation brake gear, a hand brake including a hand brake lever connected with the foundation brake gear, a jaw, a hand brake connection between the jaw and the hand brake lever, spaced guides upon which the jaw is slidably supported, a multiplying lever journaled in the jaw, a brake staff and a chain cooperating with the brake staff and the multiplying lever.

WILLIAM H. CLEGG.